Sept. 23, 1930. G. RICHARDS 1,776,451
REFRIGERATING SYSTEM
Filed April 27, 1928
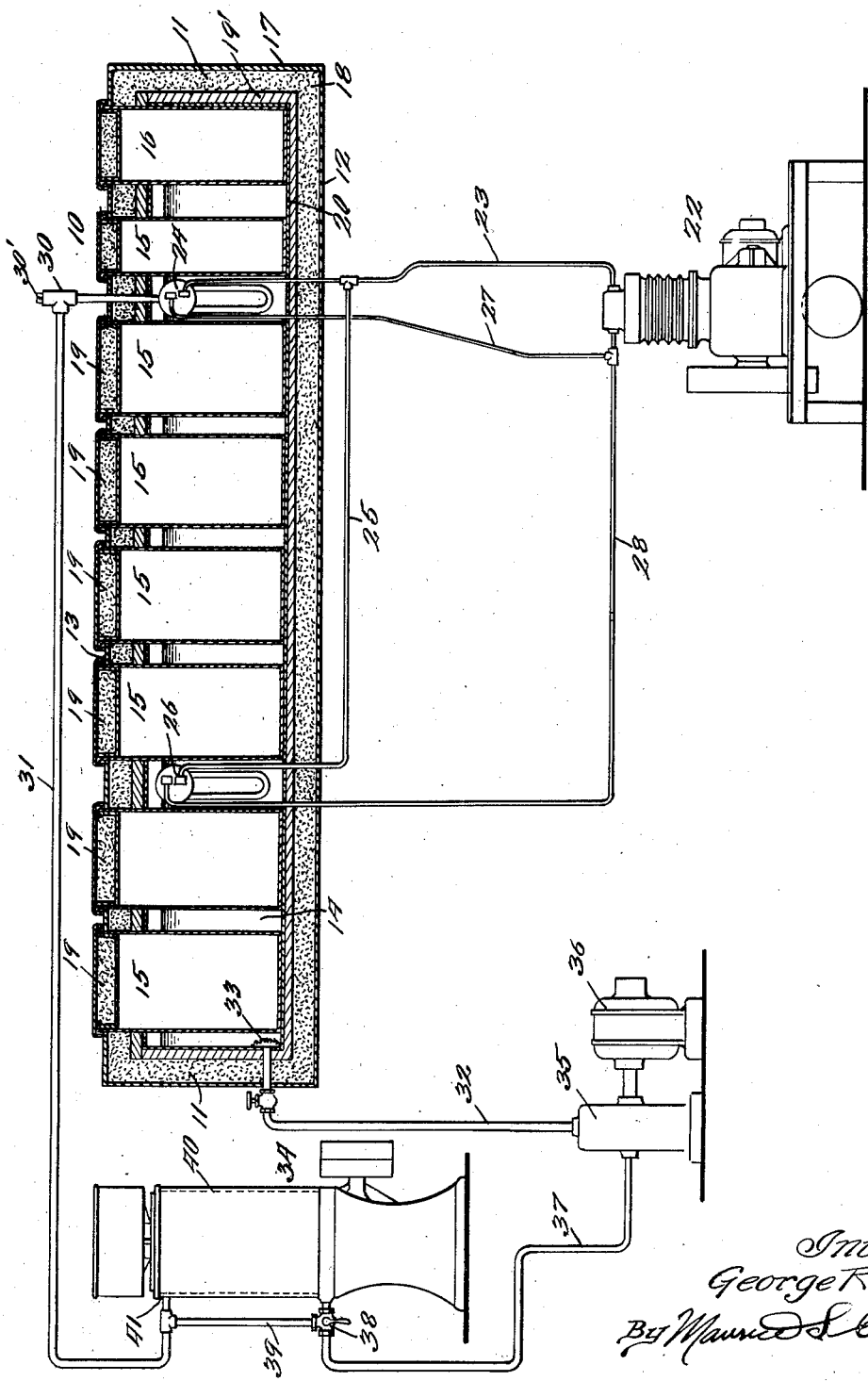

Patented Sept. 23, 1930

1,776,451

UNITED STATES PATENT OFFICE

GEORGE RICHARDS, OF CHICAGO, ILLINOIS, ASSIGNOR OF ONE-HALF TO ALEX RASS-OGIANIS, OF CHICAGO, ILLINOIS

REFRIGERATING SYSTEM

Application filed April 27, 1928. Serial No. 273,177.

The invention relates to the art of refrigeration and is especially adapted as a refrigerating system for freezing, hardening and for maintaining in a hardened condition food stuffs, such for example as ice cream, and the like.

The main object of the invention is to provide a refrigerating system, comprising in combination a refrigerating unit of usual and well known construction, an ice cream freezer, and a refrigerating cabinet into which the ice cream may be placed after the same has been mixed in the freezer for the purpose of bringing the temperature thereof down low enough to harden the same.

Another object of the invention is to provide a refrigerating system for the purpose of freezing, hardening and storing of food stuffs, such as ice cream, or the like, said system comprising a novel and improved refrigerating cabinet having a brine compartment therein, and means disposed within said compartment for bringing the temperature therein down low enough to harden said ice cream after the same has been mixed.

A further object of the invention is to provide an apparatus of the character described having in combination an ice cream freezer of usual and well known construction and a novel and improved cabinet adapted to receive the said ice cream after the same has been mixed to bring the temperature thereof down low enough to harden the same, said cabinet being also adapted for storing the said ice cream and from which it may be dispensed for use.

A still further object of the invention is to provide an apparatus of the character described having an ice cream freezer provided with a brine compartment, a cabinet having a brine chamber, and means associated with said apparatus for causing the same brine to circulate between said freezer and cabinet.

A still further object of the invention is to provide an apparatus of the character described having in combination an ice cream freezer provided with a brine outer casing, a novel and improved cabinet having a brine compartment provided with food containers projected therein, a compressor, an evaporation coil within said brine compartment and communicating with said compressor for bringing the temperature of said brine down low enough to harden the ice cream within said food containers, and means for establishing communication between said brine outer casing of said freezer and the brine compartment.

A still further object of the invention is to provide an apparatus of the character described having in combination an ice cream freezer provided with an outer casing through which a fluid having a relatively low freezing point is adapted to circulate, a cabinet provided with a plurality of food containers projecting into a brine compartment, means disposed within said brine compartment for bringing the temperature therein down low enough to harden the contents within said containers, means for establishing communication between the outer casing of the freezer and the brine compartment of the cabinet, and means for causing a circulation of fluid therethrough, whereby the cold fluid in the cabinet will be caused to circulate through the outer casing of the freezer to cool the same.

A still further object of the invention is to provide a refrigerating system adapted for mixing, hardening and storing ice cream, and the like, comprising an ice cream freezer provided with an outer casing through which brine, or the like is adapted to circulate, a cabinet having a brine compartment and a plurality of food containers projected therein, evaporation coils connected with a compressor disposed within said brine compartment for cooling the same, a conduit provided between the outer casing of said freezer and said brine compartment, means for causing the brine to circulate between said freezer and cabinet, and means positioned in said conduit for establishing or breaking communication between said freezer and cabinet.

A still further object of the invention is to provide an apparatus of the character described for freezing, hardening and storing ice cream, and the like, which will be compact and neat in appearance, and which shall be efficiently, quickly and easily operated, and which shall be cheaply and easily manufactured and installed.

With the foregoing and other objects in view which will appear as the description proceeds, the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings.

Stated generally, the invention comprises a refrigerating system having a refrigerating cabinet provided with a brine compartment therein and into which a plurality of food containers project, and having refrigerating coils or boilers connected to a suitable refrigerating machine disposed within the brine compartment and the refrigerating effect of these coils or boilers is exerted upon the food containers through the intermediary of the surrounding brine which is circulated by a suitable pump to maintain a uniformity of temperature within the brine compartment and around the various containers. An ice cream freezer of usual construction and having an outer casing through which brine or other suitable fluid of relatively low freezing point may be circulated is connected in the system, and the said brine circulating pump is adapted to circulate the same brine through both the freezer and the cabinet, whereby the cold brine passing out of the cabinet may be circulated through the freezer for cooling the same. The freezer is also provided with a three way valve of usual construction and a suitable by-pass for cutting the said freezer out of the brine circulating circuit.

For the purpose of facilitating an understanding of my invention, I have illustrated in the accompanying drawings a preferred embodiment thereof, from an inspection of which, when considered in connection with the following description, my invention, its mode of operation, and many of its advantages should be readily understood and appreciated.

Referring to the drawings:

The figure is a diagrammatic view of a refrigerating system embodying the invention, the hardening and storing cabinet being shown in section.

Referring to the drawings now more in detail, it will be observed that the cabinet proper which is adapted for hardening and storing food stuffs, such for example as ice cream, and the like, generally designated by the reference character 10, comprises the end walls 11, bottom wall 12, top wall 13, and front and rear walls, all comprising in their construction heat insulating material so as to provide a heat insulated chamber or compartment 14, into which the food containers 15, and 16, may project. Obviously, the size and shape of the cabinet may vary to provide for any desired capacity, the principle of operation of my apparatus being the same. While the walls of the cabinet may be widely varied, they preferably comprise an outer wall 17, of metal, such for example as galvanized steel plate, or the like, lined with cork board, or other suitable material 18, over the inner surface of which may be laid a facing of wood 19′, or the like, the whole construction being lined with a suitable lining 20, of copper plate, or other suitable non-corrosive material.

The chamber 14, thus formed, is, as will be noted, completely heat insulated on all sides, and is adapted to receive a plurality of food containers 15, preferably cylindrical in shape, and the chamber or compartment 16, which is rectangular in shape, and which has one side thereof in contact with the end wall 11, as shown, for a purpose to be hereinafter described. The containers are formed of suitable material, such for example as copper, or the like, and they have the interiors thereof sealed from communication with the surounding cooling chamber. A removable cover 19, also formed of heat insulating material is adapted to close the top of each container. The chamber or compartment 14, is adapted to be nearly fully filled through a suitable filler opening 30, with brine or some other liquid having a relatively low freezing point. The said filler opening is closed by a suitable plug 30′, which may be threaded into said opening. It will be noted that the containers 15, are completely surounded by the brine solution through which the refrigerating effect is exerted on the food containers. The container 16, is in contact with the brine on one side only, thus a somewhat higher temperature may be maintained in this chamber, and it may be used for storing food stuffs which it is desired not to subject to too low a temperature, as that maintained in the containers 15.

The refrigerating work performed upon the containers may be provided by any suitable refrigerating machine, and in the present instance I have shown for illustrative purposes merely a conventional machine which is indicated generally by the reference character 22, the machine being of the compressor type and having the conduits 23, and 25, leading therefrom to suitable evaporation coils or boilers 24, and 26, and the return conduits 27, and 28, leading from the said coils to the compressor. In the illustration shown in the drawings, two coils are used, however, it is to be understood that a single coil or a plurality of coils may be employed, the number used depending upon the size of the coils and also upon the temperature desired to obtain in the containers.

The gas employed as a refrigerant may be any suitable gas for that purpose, preferably sulphur dioxide which may be lubricated with a suitable oil, such for example as Russian white oil, or the like. The operation of the refrigerating machine is well known in the art and as the same forms no part of the present invention it is thought not necessary to describe the same more in detail. As will be apparent the coils or boilers 24, and 26, will exert a refrigerating effect on the food containers through the intermediary of the surrounding brine. The coils are placed and mounted in the brine compartment 14, as near the top thereof as possible. The refrigerating machine 22, may be mounted in any convenient location remote from or in proximity to the cooling cabinet, but for convenience it is preferably installed near one side of the cabinet.

Leading from the brine compartment 14, at a point near the bottom thereof, is a conduit 32, the mouth of said conduit being provided with a strainer 33, or the like, to prevent any foreign matter from getting into the same and clogging the same. The conduit 32, leads to a suitable brine circulating pump 35, which may be driven by a suitable motor 36, or the like, the other end of said pump 35, is connected by means of a conduit 37, with a suitable ice cream freezer, and in the present instance I have shown for illustrative purposes merely a conventional machine which is indicated generally by the reference character 34, said freezer having an outer casing 40, through which is adapted to circulate a fluid having a relatively low freezing point, such for example as brine, or the like, said outer brine casing being connected with the conduit 37, at the lower portion thereof, as shown. An outlet 41, is provided near the top of the casing 40, said outlet being connected with the filler opening 30, in the cabinet 10, by means of a conduit 31. Positioned in the conduit 37, near the inlet to the casing 40, is a suitable three way valve 38, said valve being adapted to control the flow of fluid to the casing 40, and to a by-pass pipe 39, leading from the conduit 37, to the conduit 31.

It will thus be noted that the brine circulating pump 35, will cause the brine to circulate in the chamber 14, from top to bottom for maintaining a uniformity of temperature therein. By the proper manipulation of the valve 38, the said brine may be caused to circulate through the freezer brine casing 40, or through the by-pass pipe 39, cutting out the casing 40. When the freezer 34, is in operation the valve 38 is actuated to direct the flow of brine therethrough to cool the same, thereby eliminating the necessity of having coils or the like provided in the said freezer, for cooling the same.

After the mixture of cream has been mixed and frozen in the freezer, it is taken out of the freezer and placed in the food containers 15, for hardening the same, the temperature in said containers being maintained sufficiently low for that purpose. The cabinet 10, is of such a size and appearance as to be used for not only hardening the ice cream but also for storing the cream from which it may be dispensed for use or consumption.

It will thus be readily apparent that I have provided refrigerating apparatus which is adapted to be set up as a unit for freezing ice cream, for hardening the same and also for storing the same, and which is so constructed as to utilize the same brine circulation for both the freezer and the hardening cabinet, whereby the said apparatus may be compactly constructed and be efficiently and economically operated.

It is believed that the invention, its mode of operation, and many of its advantages should be readily understood from the foregoing without further description; and should also be manifest that while a preferred embodiment of the invention has been shown and described for illustrative purposes, the structural details are nevertheless capable of wide variation within the purview of my invention as defined in the following claims.

What I claim and desire to secure by Letters Patent of the United States is:—

1. In combination, a relatively long refrigerating cabinet having a brine compartment therein, food containers projected in said brine compartment, a cooling coil within said brine compartment, an ice cream freezer, a brine compartment within said freezer, means for establishing communication between said brine compartment of said cabinet and the brine compartment of said freezer and means for causing the brine from said brine chamber in said cabinet to circulate through said freezer.

2. In combination, an ice cream freezer, a relatively long refrigerating cabinet, a cooling coil within said cabinet, a fluid of low freezing point in said cabinet, and means for causing the said fluid to circulate through said cabinet and said freezer for cooling the same, said fluid circulation being from the bottom of the cabinet to the top thereof.

3. In combination, an ice cream freezer provided with a brine outer casing, a relatively long cabinet having a brine compartment provided with food containers projected therein, an evaporation coil within said brine compartment for bringing the temperature of said brine down low enough to harden the ice cream within said food containers, means for establishing communication between said brine casing of the freezer and the brine compartment of the cabinet, and means for causing the said brine to circulate from the brine compartment of the cabinet to the brine casing of the freezer and then back into the said brine compartment of the cabinet.

4. In combination, an ice cream freezer provided with an outer casing through which a fluid of relatively low freezing point is adapted to flow to cool the same, a relatively long refrigerating cabinet provided with a plurality of food containers projecting into a brine compartment formed therein, means disposed within said brine compartment for bringing the temperature therein down low enough to harden the contents within said containers, means for establishing communication between the outer casing of the freezer and the brine compartment, and means for causing a circulation of brine therethrough, whereby the cold fluid in the brine compartment will be caused to circulate through the freezer to cool the same, and then back into said brine compartment of said cabinet where the temperature thereof will again be lowered by the means disposed therein.

5. In combination, an ice cream freezer having a brine outer casing through which a solution of brine is adapted to circulate, a refrigerating cabinet having a brine compartment, and a refrigerating machine connected with said cabinet for cooling the same, and means associated with said cabinet and freezer for causing the same brine to circulate through the freezer and cabinet, said brine circulation being from the bottom of the cabinet through the freezer and then back to the top of said cabinet.

6. In combination, an ice cream freezer provided with an outer casing through which brine is adapted to circulate, a relatively long cabinet having a brine compartment and a plurality of food containers projected therein, evaporation coils disposed within said brine compartment for cooling the same, a conduit provided between the outer casing of said freezer and said brine compartment, means for causing the brine to circulate between said freezer and cabinet, said means causing the brine to flow from the bottom of said cabinet through the freezer and then back to the top of said cabinet and means provided in said conduit for establishing or breaking communication between said freezer and cabinet.

7. In combination, a relatively long refrigerating cabinet having a brine compartment and a plurality of food containers projected therein, evaporation coils disposed within said brine compartment for exerting a refrigerating effect on said food containers through the intermediary of the surrounding brine, an ice cream freezer provided with an outer brine casing through which brine is adapted to circulate, a conduit connecting said brine casing of the freezer with the brine compartment of the cabinet, a brine circulating pump for causing the brine to circulate from the bottom of the cabinet through the freezer and then back to the top of said cabinet, a by-pass conduit for cutting out the freezer in the brine circulating system, and a three way valve disposed adjacent said freezer and by-pass conduit for establishing or breaking communication between said freezer and cabinet.

In testimony whereof I affix my signature.
GEORGE RICHARDS.